Jan. 28, 1958 E. S. PURINGTON 2,821,628

BALANCED SWEEP CIRCUIT

Filed March 9, 1955

INVENTOR
ELLISON S. PURINGTON
BY [signature]
ATTORNEY

United States Patent Office 2,821,628

Patented Jan. 28, 1958

2,821,628

BALANCED SWEEP CIRCUIT

Ellison S. Purington, Gloucester, Mass.

Application March 9, 1955, Serial No. 493,226

9 Claims. (Cl. 250—27)

This invention relates to sweep circuits for the deflection of the electron beam in a cathode-ray tube and more particularly to sweep circuits which operate at relatively low frequencies.

The electron beam in a cathode-ray tube used as an oscillograph, as a picture tube in television, for radar presentation, or in other ways is commonly deflected by an amount proportional to time. In some cases this time-scale deflection is repeated at a certain frequency in one direction such as the horizontal direction, and, especially in television picture tubes, a deflection proportional to time but at a lower repetition frequency is also produced in another direction such as the vertical direction. These deflections may be caused by the magnetic field set up by the deflecting current in coils of wire outside the tube, or it may be caused by the electrostatic attraction and repulsion of the electrons by charges on two plates inside the tube between which the electron beam passes.

In the case of electric deflection the circuits producing the deflection voltages must be such as to maintain the average potential of the two deflection plates at a constant value in order not to affect the velocity of the electron beam.

The circuits commonly used to produce the deflecting voltages or currents comprise amplifiers which are coupled by capacitors. Such circuits, while effective at frequencies for which the coupling capacitors possess negligible reactances, do not function properly at low frequencies including zero frequency. In some cases batteries may be substituted for those coupling capacitors which act as stopping capacitors for steady currents, but the use of batteries is objectionable as they deteriorate with time.

An object of the present invention is to provide deflection circuits which do not depend upon capacitive couplings or battery biasing and which operate at low frequencies.

A further object is to provide a circuit which requires a starting pulse for each sweep and hence which will provide a single completed sweep for a single pulse.

The invention also consists in certain new and original features of construction and combinations of parts hereinafter set forth more in detail.

The nature of the invention as to its objects and advantages, the mode of its operation and the manner of its organization, may be better understood by referring to the following description, taken in connection with the accompanying drawings forming a part thereof in which.

Like reference characters denote like parts in the several figures of the drawing.

In the following description parts will be identified by specific names for convenience, but they are intended to be generic in their application to similar parts.

Figure 1:
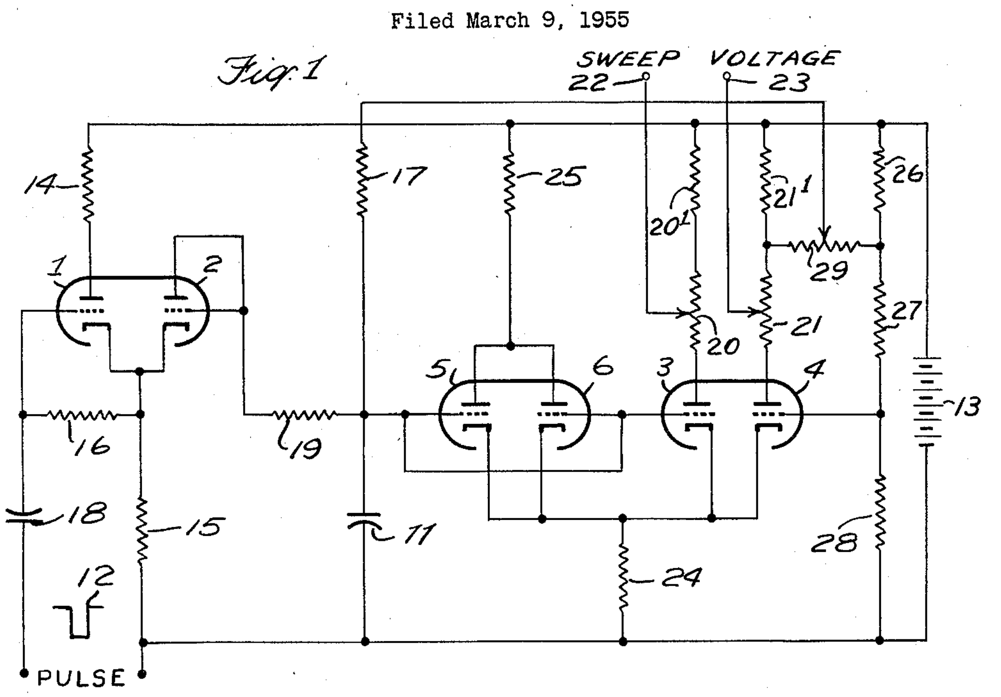
Fig. 1 is a schematic diagram of the circuits for repetitive electric deflection.

In Fig. 1, vacuum tubes 1 and 2 and their associated circuits constitute a saw-tooth wave generator which, when responsive to the input pulses like pulse 12, produces a saw-tooth voltage wave across capacitor 11.

Vacuum tubes 3, 4, 5, and 6 and their associated circuits comprise the electric-sweep push-pull amplifier producing a saw-tooth wave voltage between terminals 22 and 23, which are connected to the deflection plates in the cathode-ray tube.

Considering first the operation of the saw-tooth generator, tube 1 is normally conducting, causing a current to flow from power source 13 through resistors 14 and 15. The grid of tube 1 is normally maintained at cathode potential by grid-leak resistor 16. Tube 2 is connected as a diode, and is non-conducting while tube 1 is conducting because of the voltage across resistor 15 developed by the plate current of tube 1. During the period between pulses capacitor 11 is slowly being charged through resistor 17.

A negative-going pulse, such as 12, acting through capacitor 18 on the grid of tube 1, momentarily reduces the plate current of tube 1 flowing through resistor 15 and consequently causes tube 2 to conduct. Capacitor 11 then suddenly discharges through resistor 19 and tube 2 during the pulse 12. When the grid voltage of tube 1 returns to cathode voltage after pulse 12, tube 2 is cut off and the slow charging of capacitor 11 takes place. If only the initial portion of the charging cycle of capacitor 11 is used, as determined by the time between pulses and the magnitude of resistor 17, the increase in voltage of capacitor 11 is practically linear with respect to time. Resistors 19 and 15 are made to have sufficiently low values to permit a large fraction of the charge, accumulated in capacitor 11 between pulses, to be discharged during a pulse.

Amplifier 3 is actuated directly by the saw-tooth wave fed to its grid from capacitor 11. While the voltage of the grid of tube 3 and hence the current in plate resistors 20 and $20^1$ increases, the plate current of tube 4 through its plate resistors 21 and $21^1$ should decrease in order to maintain a constant average voltage between terminals 22 and 23. The sum of these two plate currents is therefore constant, and these currents passing through the cathode resistor 24 would produce a constant negative bias voltage to the grids of all four tubes 3, 4, 5 and 6. Tubes 5 and 6, connected in parallel and having a common plate resistor 25, have their grids connected to the grid of tube 3. Hence the plate current in resistor 25 increases as the plate current through tube 3 increases. This current through tubes 5 and 6, passing through cathode-coupling resistor 24 causes an additional voltage drop across resistor 24 and provides the proper voltage variation of the grid of tube 4 to cause its plate current to be the inverse of the plate current through tube 3, as before mentioned.

A drop resistance comprising resistors 26, 27, and 28, connected across the power source 13, provides across resistor 28 a voltage which is within the grid circuit of tube 4 and which compensates in part for the average voltage across resistor 24 caused by the plate currents of tubes 3 and 4.

A resistor 29 has one end connected to the constant-voltage junction of resistors 26 and 27, and the other end is connected to the junction of resistors 21 and $21^1$ which increases in voltage during the charging of capacitor 11 because of the decreasing plate current of tube 4. An adjustable tap on resistor 29 provides an increasing charging voltage for capacitor 11 and hence causes the capacitor voltage to increase more nearly linear with respect to time, than would be the case if the charging voltage were constant.

Figure 2:
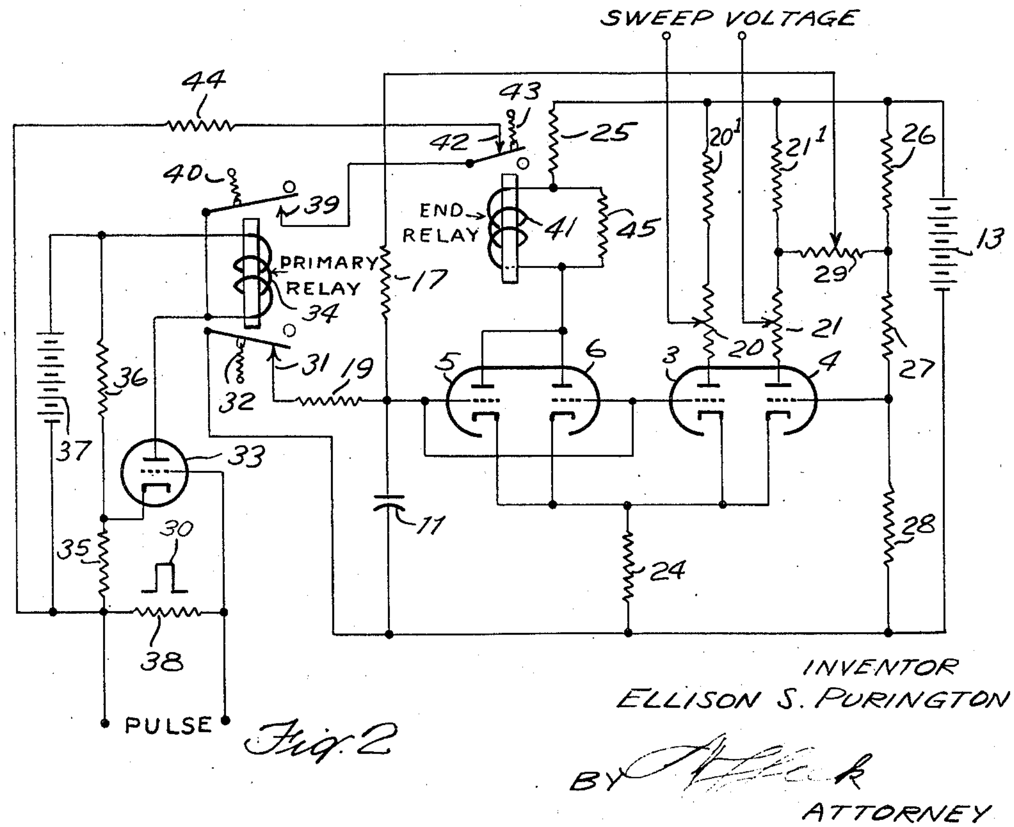
Fig. 2 is a schematic diagram of an alternative form of the invention adapted to single-sweep as well as repetitive-sweep operation.

In Fig. 2 capacitor 11 charges from a voltage tap on resistor 29 through resistor 17 and discharges through resistor 19 in the same manner as in Fig. 1. Tubes 3, 4, 5 and 6 function in the same way as the corresponding tubes in Fig. 1 function. The differences between the modification shown in Fig. 2 as compared with Fig. 1 lies in the method of controlling the charging and discharging of capacitor 11.

Before the actuating positive pulse 30 occurs, capacitor 11 is in a discharged condition by virtue of the closed circuit through resistor 19 and relay contact 31 which is held closed by spring 32.

A vacuum tube 33 has a plate circuit which includes power source 37 and the magnet coil of primary relay 34 having two armatures and two contacts 31 and 39. The grid of tube 33 is normally biased negatively to cut off the plate current by the voltage across resistor 35, caused by current from power source 37 flowing through resistor 36 in series with resistor 35. The negative end of resistor 35 is connected to the grid of tube 33 by the grid resistor 38. Before a pulse, impressed across resistor 38, acts upon the grid of tube 33, the plate current of tube 33 is cut off and contact 31 is held closed by the spring 32 while contact 39 is held open by the spring 40.

The plate circuit of tubes 5 and 6 includes in addition to resistor 25, the magnet coil 41 shunted by resistor 45 of the end relay 41. This relay has contact 42 which is held closed by spring 43 so long as the current in coil 41 is insufficient to overcome the pull of spring 43. Varying resistor 45 varies the magnitude of the plate current of tubes 5 and 6 for which the armature opens contact 42.

A positive-going pulse 30 causes tube 33 momentarily to conduct, closing contact 39 and opening contact 31. Closing contact 39 closes the circuit through resistor 44, contact 42, and relay coil 34 thus holding the two armatures of relay 34 in their attracted position, after tube 33 ceases to conduct at the end of the pulse 30. The opening of contact 31 permits capacitor 11 to charge slowly through resistor 17, thus producing the linear rise with respect to time of the voltage across capacitor 11. As this voltage increases the combined plate current of tubes 5 and 6 increases and at a certain predetermined value contact 43 opens, interrupting the holding current for relay coil 34. As a consequence contact 31 closes, causing a discharge of capacitor 11 through resistor 19. Relay 34 cannot again be actuated to start a new cycle of charging and discharging until a new pulse acts upon the grid of tube 33.

The circuit of Fig. 2 produces a complete sweep cycle of definite terminal level independent of the time intervals between initiating pulses so long as that time is not less than the time required for the charging and discharging to be completed. On the other hand, the circuit of Fig. 1 requires a continuing series of equally spaced actuating pulses. If the period between pulses is changed the maximum voltage of capacitor 11 changes and hence the extent of sweep changes. Adjustment of resistor 17 in Fig. 1 can be made to cause the extent of sweep to be the same for any frequency of pulses.

While the circuits have been shown as adapted to electric deflection, they can be used for magnetic deflection by substituting a deflecting coil for resistors $20^1$ and $21^1$, the coils being connected to produce oppositely directed deflections. Alternatively tubes 3 and 4 and their directly associated circuits can be omitted and the deflection coil substituted for resistor 25 or connected in series with it. In this case, however, the compensation of the charging voltage of capacitor 11 afforded by the tap on resistor 29 would be absent.

Although only a few of the various forms in which this invention may be embodied have been shown herein, it is to be understood that the invention is not limited to any specific construction but may be embodied in various forms without departing from the spirit of the invention.

What is claimed is:

1. A sweep circuit comprising a pair of electric discharge paths, each having cathode, control and anode elements, separate resistance elements having terminals connected to said anode elements, another resistance element having a terminal connected in common to said cathode elements, means to apply energizing potential between the other terminals of said resistance elements, means connecting one of said control elements to the other terminal of said other resistance element, a capacitor coupled between the other control element and the other terminal of said other resistance element, means coupled to said capacitor to discharge the same in response to applied pulse energy, a resistance component connected between a point on one of said separate resistance elements and said other control element, and means connected to points on said separate resistance elements to derive output voltages varying oppositely while having a substantially constant sum.

2. A sweep circuit as defined in claim 1 and wherein said first resistance component comprises a potentiometer and said other resistance component is connected to an arm on said potentiometer thereby to provide adjustment of the charging characteristic of said capacitor.

3. A sweep circuit comprising a pair of electric discharge paths, each having cathode, control and anode elements, separate resistance elements having terminals connected to said anode elements, another resistance element having a terminal connected in common to said cathode elements, means to apply energizing potential between the other terminals of said resistance elements, a further resistance element having one terminal connected in common with the other terminals of said separate resistance elements and another terminal connected to the other terminal of said other resistance element, means connecting one of said control elements to an intermediate point on said further resistance element, a capacitor coupled between the other control element and the other terminal of said other resistance element, discharging means coupled to said capacitor, a potentiometer having an arm and a resistance component connected between a point on one of said separate resistance elements and a point on said further resistance element, another resistance component connected between the arm of said potentiometer and said other control element, and means connected to points on said separate resistance elements to derive output voltages varying oppositely while having a substantially constant sum.

4. A sweep circuit as defined in claim 3 and wherein said discharge means comprises a switching device connected across said capacitor for direct current flow, an electron discharge device having a cathode electrode, a grid and an anode electrode, means biasing said grid to establish anode-to-cathode current flow in one of two stable states of conduction, and means to apply pulse energy to said grid to establish anode-to-cathode current flow in the other of two stable states of conduction, and means connecting said switching device to one of said electrodes of said electron discharge device to alter the charge across said capacitor in response to the charge of anode-to-cathode current flow.

5. A sweep circuit as defined in claim 3 and wherein said discharge means comprises a diode element and a resistor connected in series across said capacitor, an electric discharge device having a cathode-anode path connected in series with said resistor and arranged normally to conduct and a control electrode interposed in said cathode-anode path, and means to apply negative going pulse energy to said control electrode to discharge said capacitor.

6. A sweep circuit as defined in claim 3 and incorporating means coupled to said discharge means and responsive to applied pulse energy to charge said capacitor only once.

7. A sweep circuit as defined in claim 3 and wherein said discharge means comprises a relay having armature contacts connected to said capacitor to discharge the same and having a winding actuating the armature in response to current flow in said winding, an electron discharge device having a cathode electrode, a grid, and an anode electrode, means to connect said winding in series with the anode-cathode path of said electron discharge device, means to apply energizing potential across said series circuit, means biasing said grid with respect to said cathode to establish anode-to-cathode current flow in one of two stable states of conduction, and means to apply pulse energy between said grid and said cathode electrode to establish anode-to-cathode current flow in the other of said two states of conduction to alter the charge across said capacitor.

8. A sweep circuit as defined in claim 7 and wherein said relay armature comprises an additional set of holding contacts and another relay having holding contacts and a winding is interposed in one of said electric discharge paths with both holding contacts connected to hold the first said relay energized in response to applied pulse energy for a single cycle of operation only.

9. A sweep circuit as defined in claim 8 and wherein an additional electric discharge path is connected in parallel with said one electric discharge path and said other relay winding is confined to said additional electric discharge path.

References Cited in the file of this patent

UNITED STATES PATENTS

| | | |
|---|---|---|
| 2,208,254 | Geohegan | July 16, 1940 |
| 2,350,069 | Schrader et al. | May 30, 1944 |
| 2,355,363 | Christaldi | Aug. 8, 1944 |
| 2,435,331 | Street | Feb. 3, 1948 |
| 2,462,292 | Snyder | Feb. 22, 1949 |